US006539034B1

(12) United States Patent
Shimosaka

(10) Patent No.: US 6,539,034 B1
(45) Date of Patent: Mar. 25, 2003

(54) METHOD AND APPARATUS FOR TIME-DIVISION MULTIPLEXING AND DEMULTIPLEXING

(75) Inventor: Naoki Shimosaka, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/154,512

(22) Filed: Sep. 16, 1998

(30) Foreign Application Priority Data

Nov. 7, 1997 (JP) .............................................. 9-305798

(51) Int. Cl.[7] .............................. H04J 3/02; H04J 3/04
(52) U.S. Cl. ...................................... 370/535; 370/537
(58) Field of Search ................................ 370/535, 537, 370/539, 540, 541

(56) References Cited

U.S. PATENT DOCUMENTS

| 4,727,541 A | * | 2/1988 | Mori et al. | 370/112 |
| 4,835,770 A | * | 5/1989 | Hayano | 370/94 |
| 5,001,711 A | * | 3/1991 | Obana et al. | 370/112 |
| 6,034,974 A | * | 3/2000 | Matsuoka et al. | 370/542 |

FOREIGN PATENT DOCUMENTS

| EP | 0 117 544 A2 | 9/1984 |
| EP | 0 677 934 A2 | 10/1995 |
| JP | 63204838 | 8/1988 |

OTHER PUBLICATIONS

Yoshihiko Uematsu et al., "Parallel mB1C Word Alignment Procedure and Its Performance for High–Speed Optical Transmission," IEICE Trans. Commun., V. 80–B, 1997, pp. 476–482.

* cited by examiner

Primary Examiner—Alpus H. Hsu
Assistant Examiner—Toan Nguyen
(74) Attorney, Agent, or Firm—Young & Thompson

(57) ABSTRACT

The method and apparatus for time-division multiplexing/demultiplexing of signals multiplexes input signals, and a predetermined frame synchronization pattern signal to thereby generate the first time-division multiplexed signals, then multiplexes each of the first time-division multiplexed signals to thereby generate the second time-division multiplexed signal. After receiving from a transmission line, the time-division multiplexed signal is demultiplexed to thereby generate a predetermined number of first time-division demultiplexed signals, then each of the first time-division demultiplexed signals is demultiplexed to generate the second time-division demultiplexed signals, and the orders of the second time-division demultiplexed signals are permuted until the same signal as a predetermined frame synchronization pattern signal is obtained from the second time-division demultiplexed signal corresponding to the predetermined frame synchronization pattern signal of the second time-division demultiplexed signals.

8 Claims, 8 Drawing Sheets

| CASE | second time-division demultiplexed signal (So2-) | | | | | | | | | | | | | | | |
|---|---|---|---|---|---|---|---|---|---|---|---|---|---|---|---|---|
| | 0 | 1 | 2 | 3 | 4 | 5 | 6 | 7 | 8 | 9 | 10 | 11 | 12 | 13 | 14 | 15 |
| 1. | 1 | 9 | 2 | 10 | 3 | 11 | 4 | 12 | 5 | 13 | 6 | 14 | 7 | 15 | 8 | 16 |
| 2. | 2 | 10 | 3 | 11 | 4 | 12 | 5 | 13 | 6 | 14 | 7 | 15 | 8 | 16 | 9 | ① |
| 3. | 3 | 11 | 4 | 12 | 5 | 13 | 6 | 14 | 7 | 15 | 8 | 16 | 9 | ① | 10 | ② |
| 4. | 4 | 12 | 5 | 13 | 6 | 14 | 7 | 15 | 8 | 16 | 9 | ① | 10 | ② | 11 | ③ |
| 5. | 5 | 13 | 6 | 14 | 7 | 15 | 8 | 16 | 9 | ① | 10 | ② | 11 | ③ | 12 | ④ |
| 6. | 6 | 14 | 7 | 15 | 8 | 16 | 9 | ① | 10 | ② | 11 | ③ | 12 | ④ | 13 | ⑤ |
| 7. | 7 | 15 | 8 | 16 | 9 | ① | 10 | ② | 11 | ③ | 12 | ④ | 13 | ⑤ | 14 | ⑥ |
| 8. | 8 | 16 | 9 | ① | 10 | ② | 11 | ③ | 12 | ④ | 13 | ⑤ | 14 | ⑥ | 15 | ⑦ |
| 9. | 9 | ① | 10 | ② | 11 | ③ | 12 | ④ | 13 | ⑤ | 14 | ⑥ | 15 | ⑦ | 16 | ⑧ |
| 10. | 10 | ② | 11 | ③ | 12 | ④ | 13 | ⑤ | 14 | ⑥ | 15 | ⑦ | 16 | ⑧ | ① | ⑨ |
| 11. | 11 | ③ | 12 | ④ | 13 | ⑤ | 14 | ⑥ | 15 | ⑦ | 16 | ⑧ | ① | ⑨ | ② | ⑩ |
| 12. | 12 | ④ | 13 | ⑤ | 14 | ⑥ | 15 | ⑦ | 16 | ⑧ | ① | ⑨ | ② | ⑩ | ③ | ⑪ |
| 13. | 13 | ⑤ | 14 | ⑥ | 15 | ⑦ | 16 | ⑧ | ① | ⑨ | ② | ⑩ | ③ | ⑪ | ④ | ⑫ |
| 14. | 14 | ⑥ | 15 | ⑦ | 16 | ⑧ | ① | ⑨ | ② | ⑩ | ③ | ⑪ | ④ | ⑫ | ⑤ | ⑬ |
| 15. | 15 | ⑦ | 16 | ⑧ | ① | ⑨ | ② | ⑩ | ③ | ⑪ | ④ | ⑫ | ⑤ | ⑬ | ⑥ | ⑭ |
| 16. | 16 | ⑧ | ① | ⑨ | ② | ⑩ | ③ | ⑪ | ④ | ⑫ | ⑤ | ⑬ | ⑥ | ⑭ | ⑦ | ⑮ |

1: $\overline{Si2}$   2: Si2   3: Si4   4: Si6   5: Si8

6: Si10   7: Si12   8: Si14   9: Si1   10: Si3

11: Si5   12: Si7   13: Si9   14: Si11   15: Si13

16: Si15

Circled number indicates 1 frame forwarded data

FIG. 3

| CASE | \multicolumn{16}{c}{selector (108-)} |
|---|---|---|---|---|---|---|---|---|---|---|---|---|---|---|---|---|
| | 0 | 1 | 2 | 3 | 4 | 5 | 6 | 7 | 8 | 9 | 10 | 11 | 12 | 13 | 14 | 15 |
| 1 | 1 | 3 | 5 | 7 | 9 | 11 | 13 | 15 | 2 | 4 | 6 | 8 | 10 | 12 | 14 | 16 |
| 2 | (16) | 1 | 3 | 5 | 7 | 9 | 11 | 13 | 15 | 2 | 4 | 6 | 8 | 10 | 12 | 14 |
| 3 | (14) | (16) | 1 | 3 | 5 | 7 | 9 | 11 | 13 | 15 | 2 | 4 | 6 | 8 | 10 | 12 |
| 4 | (12) | (14) | (16) | 1 | 3 | 5 | 7 | 9 | 11 | 13 | 15 | 2 | 4 | 6 | 8 | 10 |
| 5 | (10) | (12) | (14) | (16) | 1 | 3 | 5 | 7 | 9 | 11 | 13 | 15 | 2 | 4 | 6 | 8 |
| 6 | (8) | (10) | (12) | (14) | (16) | 1 | 3 | 5 | 7 | 9 | 11 | 13 | 15 | 2 | 4 | 6 |
| 7 | (6) | (8) | (10) | (12) | (14) | (16) | 1 | 3 | 5 | 7 | 9 | 11 | 13 | 15 | 2 | 4 |
| 8 | (4) | (6) | (8) | (10) | (12) | (14) | (16) | 1 | 3 | 5 | 7 | 9 | 11 | 13 | 15 | 2 |
| 9 | (2) | (4) | (6) | (8) | (10) | (12) | (14) | (16) | 1 | 3 | 5 | 7 | 9 | 11 | 13 | 15 |
| 10 | (15) | (2) | (4) | (6) | (8) | (10) | (12) | (14) | (16) | 1 | 3 | 5 | 7 | 9 | 11 | 13 |
| 11 | (13) | (15) | (2) | (4) | (6) | (8) | (10) | (12) | (14) | (16) | 1 | 3 | 5 | 7 | 9 | 11 |
| 12 | (11) | (13) | (15) | (2) | (4) | (6) | (8) | (10) | (12) | (14) | (16) | 1 | 3 | 5 | 7 | 9 |
| 13 | (9) | (11) | (13) | (15) | (2) | (4) | (6) | (8) | (10) | (12) | (14) | (16) | 1 | 3 | 5 | 7 |
| 14 | (7) | (9) | (11) | (13) | (15) | (2) | (4) | (6) | (8) | (10) | (12) | (14) | (16) | 1 | 3 | 5 |
| 15 | (5) | (7) | (9) | (11) | (13) | (15) | (2) | (4) | (6) | (8) | (10) | (12) | (14) | (16) | 1 | 3 |
| 16 | (3) | (5) | (7) | (9) | (11) | (13) | (15) | (2) | (4) | (6) | (8) | (10) | (12) | (14) | (16) | 1 |

1: So2-0   2: So2-1   3: So2-2   4: So2-3   5: So2-4

6: So2-5   7: So2-6   8: So2-7   9: So2-8   10: So2-9

11: So2-10   12: So2-11   13: So2-12   14: So2-13   15: So2-14

16: So2-15

Circled number indicates 1 frame forwarded data

METHOD AND APPARATUS FOR TIME-DIVISION MULTIPLEXING AND DEMULTIPLEXING

BACKGROUND OF THE INVENTION

1. Field of the Invention

The present invention relates to a method and an apparatus for time-division multiplexing and demultiplexing of signals used in a digital transmission system, and more particularly to a method and an apparatus for time-division multiplexing and demultiplexing of signals, as well as a method and an apparatus for time-division demultiplexing of signals performed in a plurality of steps.

2. Description of the Related Art

In a digital transmission system, time-division multiplexing (TDM) technology has been widely used for transmitting a plurality of digital signals. For realizing the TDM system, it is indispensable to install a time-division multiplexer on a transmitter side, and a time-division demultiplexer on a receiver side. The time-division multiplexer multiplexes input digital signals, each having the same transmission rate. The time-division demultiplexer, on the other hand, demultiplexes the received multiplexed signal to restore the original digital signals.

FIG. 8 shows a conventionally used time-division multiplexing/demultiplexing apparatus. In this figure, the time-division multiplexing factor is assumed to be 16. A 16:1 time-division multiplexer 3 receives 15 digital input signals Si1 through Si15. One of the input signal, Si0, is inputted to the remaining input terminal 0 of the time-division multiplexer 3, after being inverted by an inverter 4. This inverted signal input is used as a frame synchronization signal, indicating the start position of each frame. The multiplexed signal Smpx is output on a transmission line 10.

On a receiver side, a 1:16 time-division demultiplexer 5 demultiplexes the time-division multiplexed signal Smpx supplied via a transmission line to produce 16 time-division demultiplexed signals So1-0 to So1-15 and outputs those signals.

A bit rotator circuit 7 rotates spatial orders of digital input signals So1-0 to So1-15 read from the 1:16 time-division demultiplexer 5, according to the applied clock signal CLK. Each time a clock pulse of the CLK is supplied from a frame synchronizing circuit 9 to be described later, the bit rotator circuit 7 rotates the order of the time-division separated signals So1-0 to So1-15, i.e., each input signal moves to the next adjacent output position. The permuted signals are outputted as output signals So1 through So15.

The frame synchronizing circuit 9 monitors the output from the bit rotator circuit 7 and transmits a control signal to the bit rotator circuit 7 to thereby synchronize frames of the 16:1 time-division multiplexer 3 and the 1:16 time-division demultiplexer 5. For monitoring the synchronization status, two outputs, So0 and So1, are supplied for the frame synchronizing circuit 9. Once the synchronization is established, signal So0 is always the inverted signal of So1 for every bit. On the other hand, when the synchronization is not established, So0 often coincides with So1. Therefore, synchronization can be monitored by detecting the coincidence frequency of So0 and So1. In order to detect this frequency, the frame synchronizing circuit 9 is typically composed of a well-known racing counter conducting both forward and backward protection. When the coincidence frequency increases, that is, frames for multiplexer/demultiplexer are not synchronized, pulse signal CLK is emitted from the frame synchronizing circuit, one pulse for each coincidence bit detected. After necessary permutation is performed in bit rotator circuit 7 according to the CLK input, and the coincidence frequency decrease follows, the pulses in the CLK vanishes. At this time, the synchronization is established.

However, the conventional time-division multiplexer/demultiplexer has the following problems:

When compared with an 8:1 or lower time-division multiplexing/demultiplexing apparatus for high speed digital signals of about 150 Mb/s, for example, 143 Mb/s for a broadcasting studio system and 155 Mb/s for an SDH system, a 16:1 or higher apparatus costs a few times more.

The reason is as follows: The circuit configurations of a time-division multiplexer and a time-division demultiplexer are comparatively simple for up to approximately 8:1. Even for several Gb/s, very high operation speed is not required for circuit components. For this multiplexity, there are commercially available multiplexer/demultiplexer ICs made on silicon substrate, available at a reasonable price. For multiplexers of around 16:1 or higher, however, circuit structure for the multiplexer/demultiplexer is significantly complicated. As timing margins decrease, high speed operation for each circuit component is critical, especially for bit rates of above several Gb/s. Although for this high speed operation, gallium arsenide ICs are available, they have a prohibitive price of several times that of comparable silicon ICs.

SUMMARY OF THE INVENTION

In view of the foregoing and other problems of the conventional apparatus, an object of the present invention is to provide an apparatus and method for time-division multiplexing/demultiplexing which can be operated at rates as high as several gigabits per second and can be fabricated with low cost.

In a first aspect of the present invention, an inventive apparatus for time-division multiplexing/demultiplexing of signals is provided which includes a first time-division multiplexer for multiplexing a plurality of input signals and a predetermined frame synchronization pattern signal to thereby generate first time-division multiplexed signals, a second time-division multiplexer for multiplexing each of the first time-division multiplexed signals to thereby generate a second time-division multiplexed signal, a first time-division demultiplexer for demultiplexing each of the second time-division multiplexed signals to thereby generate a predetermined number of first time-division demultiplexed signals, a second time-division demultiplexers for demultiplexing each of the first time-division demultiplexed signals to thereby generate second time-division demultiplexed signals, and a frame synchronizing circuit for protecting synchronization of signals by permuting orders of the second time-division demultiplexed signals until the same signal as the predetermined frame synchronization pattern signal is obtained from a second time-division demultiplexed signal corresponding to the predetermined frame synchronization pattern signal of the second time-division demultiplexed signals.

Additionally, the predetermined frame synchronization pattern signal used in the above apparatus may be an inverted signal of one of the plurality of input signals, and the frame synchronizing circuit permutes orders of the second time-division demultiplexed signals until one of the second time-division demultiplexed signals mismatches bit by bit with another one of the second time-division demultiplexed signals corresponding to the inverted signal.

Furthermore, the frame synchronizing circuit may preferably permute orders of the second time-division demultiplexed signals so that the phase differences among the second time-division demultiplexed signals are canceled.

Further, the above apparatus may include extra multiplexers and demultiplexers for performing up to n-th (where n is an integer) stage multiplexing/demultiplexing, in addition to the first and second time-division multiplexing processing and the first and second time-division demultiplexing processing.

Further, the numbers of the input signals and the first time-division multiplexed signals may be selected to number 15 and 8, respectively.

Further, the allowable order permutation patterns for the above selected numbers may preferably be as follows:

(a) from first signal of the second time-division demultiplexed signals to first terminal of the multiplexing/demultiplexing apparatus output terminals, from third to second, from fifth to third, from seventh to fourth, from ninth to fifth, from eleventh to sixth, from thirteenth to seventh, from fifteenth to eighth, from second to ninth, from fourth to tenth, from sixth to eleventh, from eighth to twelfth, from tenth to thirteenth, from twelfth to fourteenth, from fourteenth to fifteenth, from sixteenth to fifteenth; and (b) k (k=1,2, . . . 15) positions rotation applied to the (a), with same direction for all the k's.

Also, the following signals may preferably be delayed by one bit:

(1) for the (b) where k=1 and first signal moves to second terminal under the direction, the sixteenth signal;

(2) for the (b) where k=2 and first signal moves to second terminal under the direction, the fourteenth signal is added to the (1);

(3) for the (b) where k=3 and first signal moves to second terminal under the direction, the twelfth signal is added to the (2);

(4) for the (b) where k=4 and first signal moves to second terminal under the direction, the tenth signal is added to the (3);

(5) for the (b) where k=5 and first signal moves to second terminal under the direction, the eighth signal is added to the (4);

(6) for the (b) where k=6 and first signal moves to second terminal under the direction, the sixth signal is added to the (5);

(7) for the (b) where k=7 and first signal moves to second terminal under the direction, the fourth signal is added to the (6);

(8) for the (b) where k=8 and first signal moves to second terminal under the direction, the second signal is added to the (7);

(9) for the (b) where k=9 and first signal moves to second terminal under the direction, the fifteenth signal is added to the (8);

(10) for the (b) where k=10 and first signal moves to second terminal under the direction, the thirteenth signal is added to the (9);

(11) for the (b) where k=11 and first signal moves to second terminal under the direction, the eleventh signal is added to the (10);

(12) for the (b) where k=12 and first signal moves to second terminal under the direction, the ninth signal is added to the (11);

(13) for the (b) where k=13 and first signal moves to second terminal under the direction, the seventh signal is added to the (12);

(14) for the (b) where k=14 and first signal moves to second terminal under the direction, the fifth signal is added to the (13); and

(15) for the (b) where k=15 and first signal moves to second terminal under the direction, the third signal is added to the (14).

BRIEF DESCRIPTION OF THE DRAWINGS

The above and other objects, features and advantages of the present invention will become more apparent from the following detailed description when taken in conjunction with the accompanying drawings wherein:

FIG. 3 shows all the cases of distribution of input signals Si1 to Si15 plus inverted Si2 among So2-0 to So2-15;

FIG. 4 illustrates a signal selection logic table for the selectors 108-0 to 108-15 for each case;

DETAILED DESCRIPTION OF THE PREFERRED EMBODIMENTS

Figure 1:
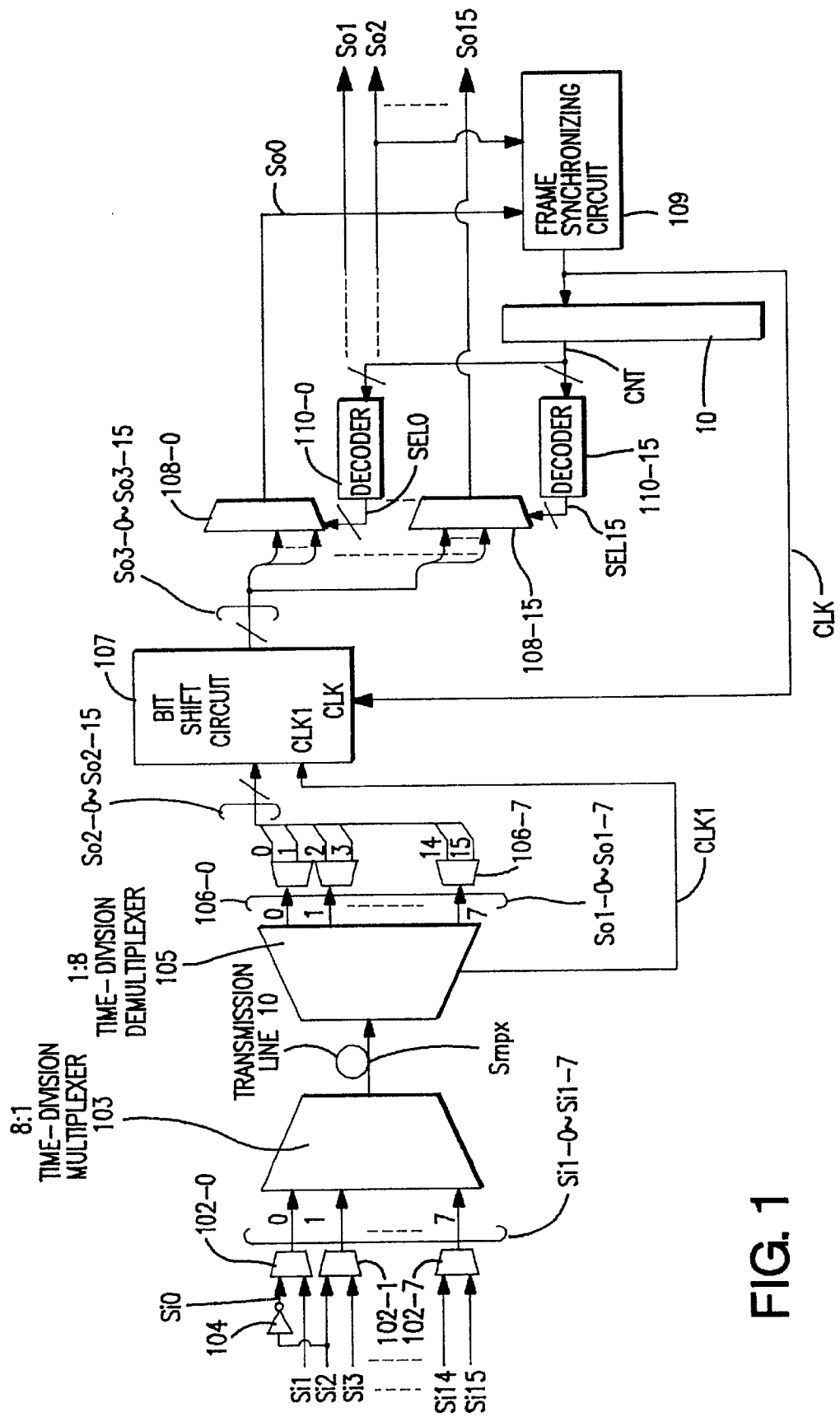
FIG. 1 is a block diagram of a time-division multiplexing/demultiplexing apparatus in an embodiment of the present invention.

Hereunder, the examples of the present invention will be described with reference to the accompanying drawings. FIG. 1 is a block diagram of a time-division multiplexing/demultiplexing apparatus of an embodiment of the present invention. A time-division factor of 16 is assumed in this embodiment.

The time-division multiplexer in this embodiment comprises 2:1 time-division multiplexers 102-0 to 102-7, a 8:1 time-division multiplexer 103 and an inverter 104.

Input digital signals Si1 to Si15 with bit rate of 143 Mb/s (megabits per second) are incident upon eight 2:1 time-division multiplexers 102-0 to 102-7. Each of the 2:1 time-division multiplexers receives two digital input signals, then multiplexes to generate 8 first time-division multiplexed signals Si1-0 to Si1-7 with a 286 Mb/s bit rate. The inversion of input signal Si2 output by an inverter 104 is inputted to the remaining one input terminal of one 2:1 time-division multiplexer 102-1. This inverted signal is used for indicating the starting point of each frame generated by time-division multiplexing. On the receiver (demultiplexer) side, frame synchronization is performed by searching for this inverted signal.

Each of the 2:1 time-division multiplexers 102-0 to 102-7 also receives the same clocks (not illustrated) for multiplexing. Thus, phases for output signals Si1-0 to Si1-7 of the 2:1 time-division multiplexers are aligned.

Figure 2:
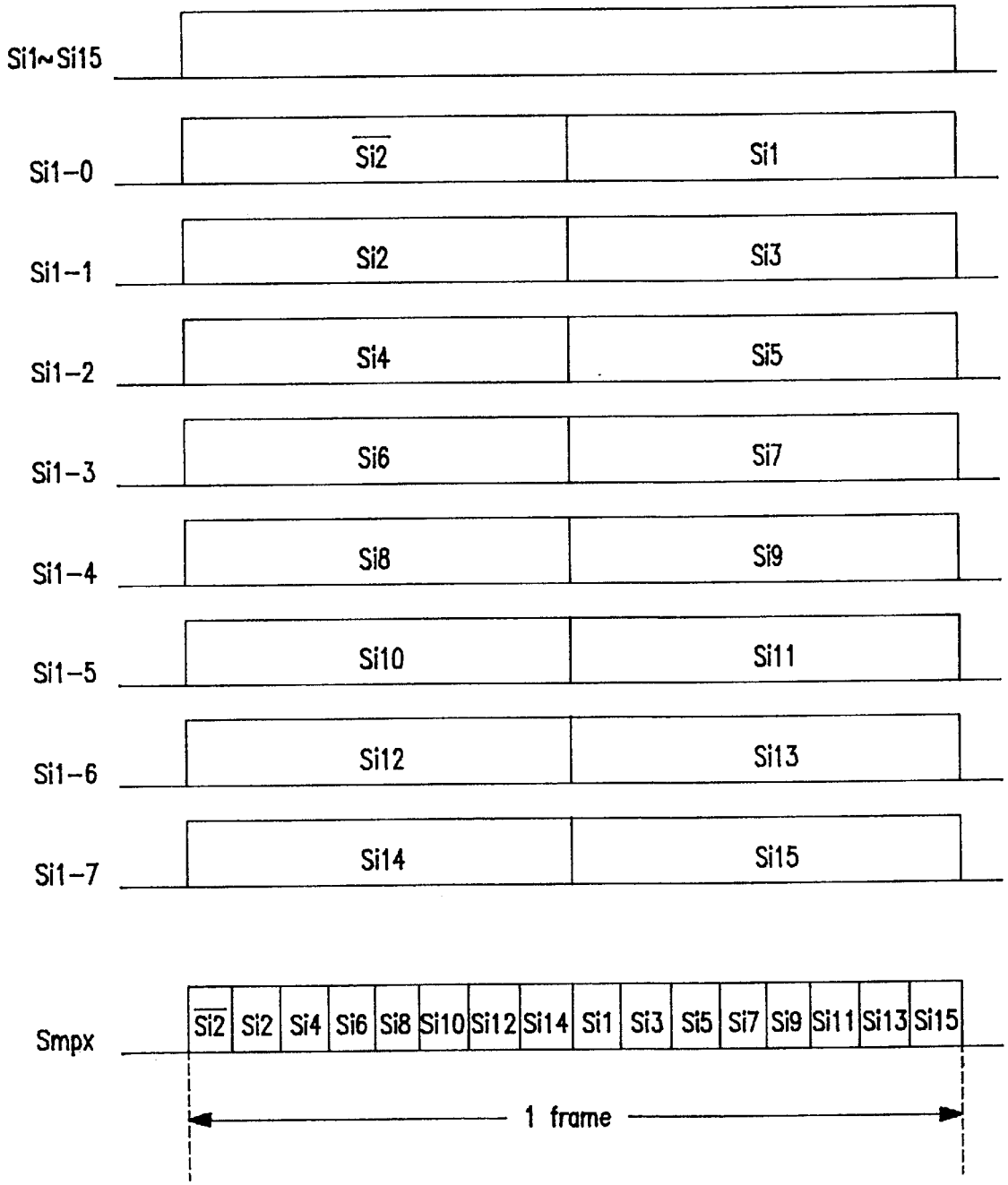
FIG. 2 shows input signals Si1 to Si15, first time-division multiplexed signals Si1-0 to Si1-7 and a second multiplexed signal Smpx.

The 8:1 time-division multiplexer 103 receives 8 first time-division multiplexed signals Si1-0 to Si1-7 and multiplexes each of these 8 signals to thereby generate and output the second time-division multiplexed signal Smpx at 2.29 Gb/s (gigabits per second) to a transmission line 10. The multiplexed signal format is indicated in FIG. 2.

The time-division demultiplexer in this embodiment comprises a 1:8 time-division demultiplexer, 1:2 time-division demultiplexers 106-0 to 106-7, a bit shift circuit 107, selectors 108-0 to 108-15, decoders 110-0 to 110-15, a frame counter 101 and a frame synchronization circuit 109.

The 1:8 time-division demultiplexer 105 demultiplexes the second multiplexed signal Smpx supplied via a transmission line 10 to 8 first time-division demultiplexed signals So1-0 to So1-7 at 286 Mb/s and outputs those signals.

Each of the 8 1:2 time-division demultiplexers 106-0 to 106-7 demultiplexes each of the first time-division demultiplexed signals So1-0 to So1-7 to a total of 16 second time-division demultiplexed signals So2-0 to So2-15 at 143 Mb/s and outputs those 16 signals.

The input signals Si1 to Si15 and the inverted Si2 are distributed among the output signals So2-0 to So2-15. This distribution pattern can be divided into 16 cases according to the initial readout phase of the 1:8 time-division demultiplexer and the 1:2 time-division demultiplexers. All the allowable distribution cases are shown in FIG. 3.

Using FIG. 3, we can derive appropriate logic table for decoders 110-0 to 110-15. For example, if the present distribution case is the case 1 in FIG. 3, the selector 108-1 should select So2-1 to obtain Si1 for output signal So2. For each case and each selector, we can determine which So2-i (i=0,1,2, . . . 15) should be selected. The result is shown in FIG. 4. In FIG. 4, the circled number indicates that the selected signal is 1 frame forwarded compared with the signals represented by the uncircled numbers.

In this embodiment, the bit shift circuit 107 is inserted between 1:2 time-division demultiplexers 106-0 to 106-7 and selectors 108-0 to 108-15 to cancel the above-mentioned signal phase discrepancy. The bit shift circuit 107 shifts some of the second time-division demultiplexed signals So2-0 to So2-15 by a single bit to thereby compensate for a single bit lag (maximum) generated among second time-division demultiplexed signals So2-0 to So2-15 when the signals are inputted/outputted to/from the 1:8 time-division demultiplexer 105 and the 1:2 time-division demultiplexers 106-0 to 106-7.

Figure 5:
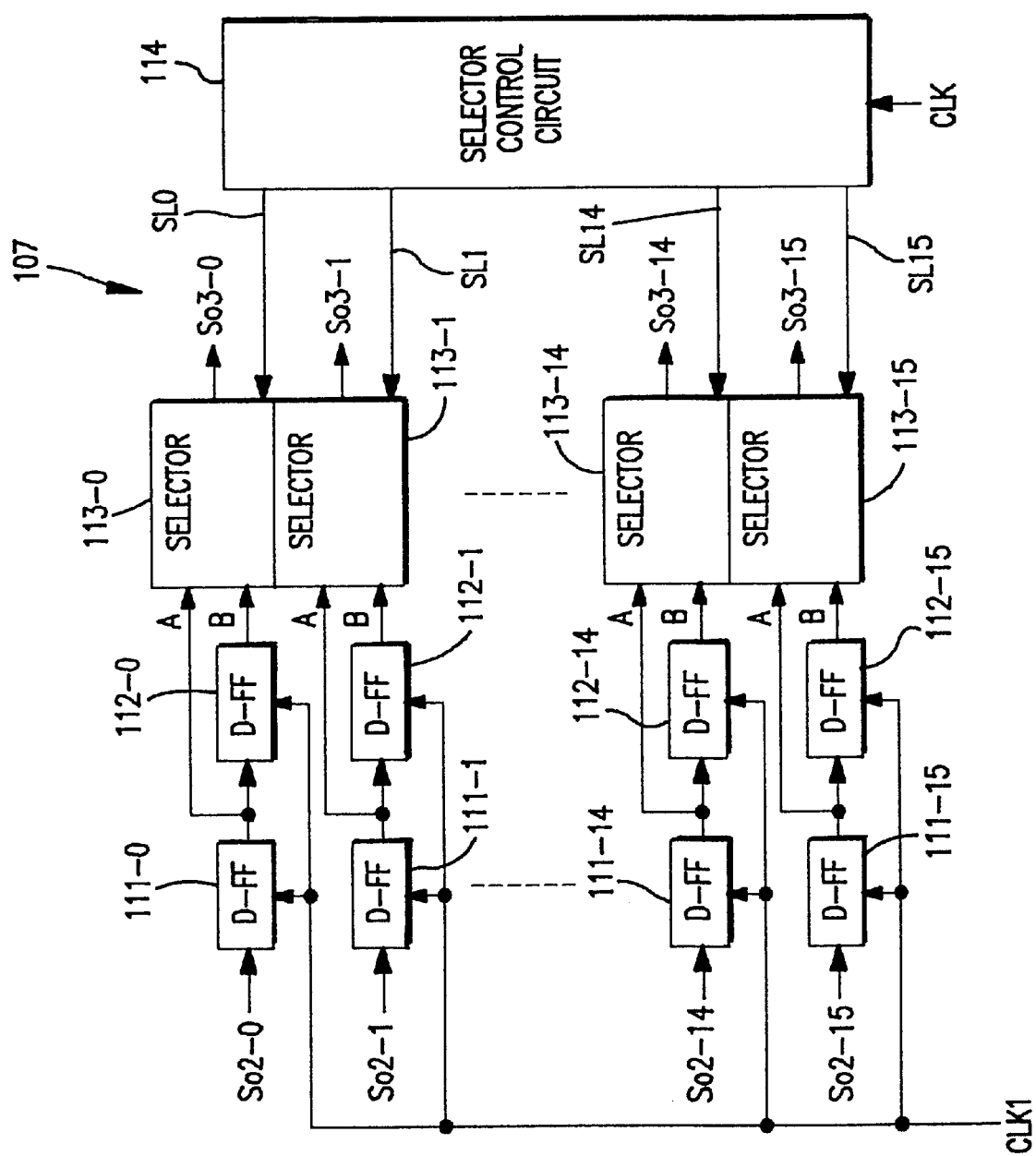
FIG. 5 is a block diagram of a bit shift circuit of the time-division multiplexing/demultiplexing apparatus according to the present invention.

FIG. 5 is a block diagram of the bit shift circuit 107, which restores phase coincidence between the bit shift output signals So3-0 to So3-15 and the digital input signals Si0 to Si15.

The bit shift circuit 107 comprises D-FFs (D-type flip-flop circuit) 111-0 to 111-15 and 112-0 to 112-15, selectors 113-0 to 113-15 and selector control circuit 114.

Each of the D-FFs 111-0 to 111-15 shown in FIG. 5 delays the second time-division demultiplexed signals So2-0 to So2-15 by a period of the input clock signal CLK1. The clock signal CLK is synchronized with one frame period of the second time-division multiplexed signal Smpx.

The D-FFs 112-0 to 112-15 are connected to the output terminals of the D-FF 111-0 to 111-15, respectively, and used to delay the second time-division demultiplexed signals So2-0 to So2-15 further by a period of the clock signal CLK1. Since the clock signal CLK is also applied to decoders 110-0 to 110-15, the bit shifting operation is conducted in cooperation with selector's selection state scanning. In the present embodiment, the combination of bit shifting operation and the selector's selection state scanning is comparable to the bit rotating operation for frame synchronization employed in the conventional demultiplexer.

Each of selectors 113-0 to 113-15 selects one of the D-FFs 111-0 to 111-15 outputs or 112-0 to 112-15 outputs according to the selection signal (SL0 to SL15).

Figure 6:
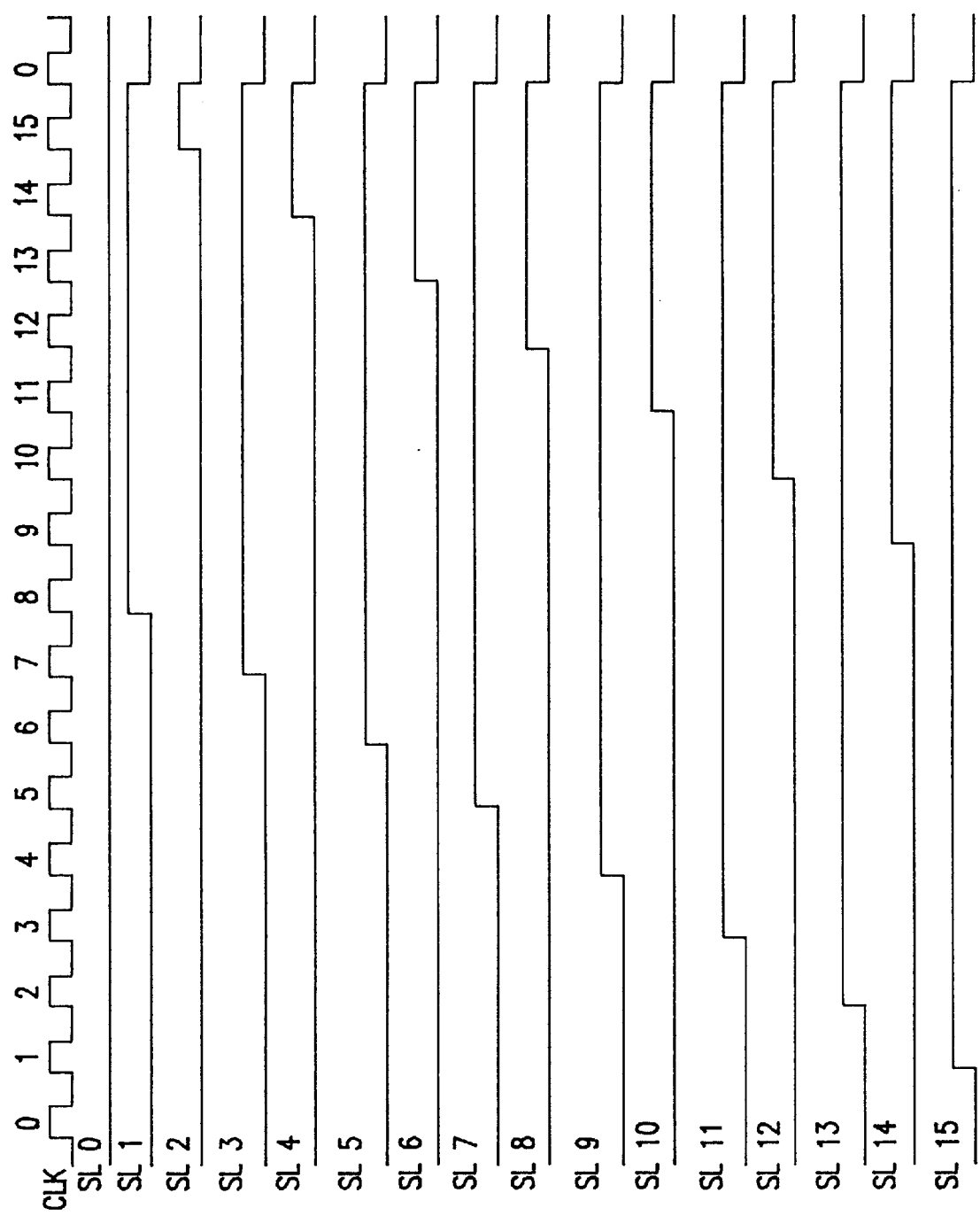
FIG. 6 is a timing chart of input signals to each selector of the bit shift circuit of the time-division multiplexing/demultiplexing apparatus in the embodiment of the present invention.

The selector control circuit 114 generates select signals SL0 to SL15 shown in FIG. 6 according to the phase shift signal CLK and outputs the generated signals. FIG. 3 shows one cycle of the select signal transition. These select signals are generated as binary signals.

When the select signals SL0 to SL15 are low, the selectors 113-0 to 113-15 select the input A and output signals that are the delayed second time-division demultiplexed signals So2-0 to So2-15 by one clock cycle. On the other hand, when the select signals SL0 to SL15 are high, the selectors 113-0 to 113-15 select the input B and output signals that are the delayed second time-division demultiplexed signals So2-0 to So2-15 by two clock cycles. The selector output signals are So3-0 to So3-15. In such a way, the phase lag among So2-0 to So2-15 can be canceled.

In FIG. 1, each of the selectors 108-0 to 108-15 receives output signals So3-0 to So3-15 of the bit shift circuit 107 and selects and outputs one of those signals according to the select signals SEL0 to SEL15 supplied from the decoders 110-0 to 110-15 provided in the selectors 108-0 to 108-15. Outputs of the decoders 110-0 to 110-15 change according to frame counter 101 output.

Figure 7:
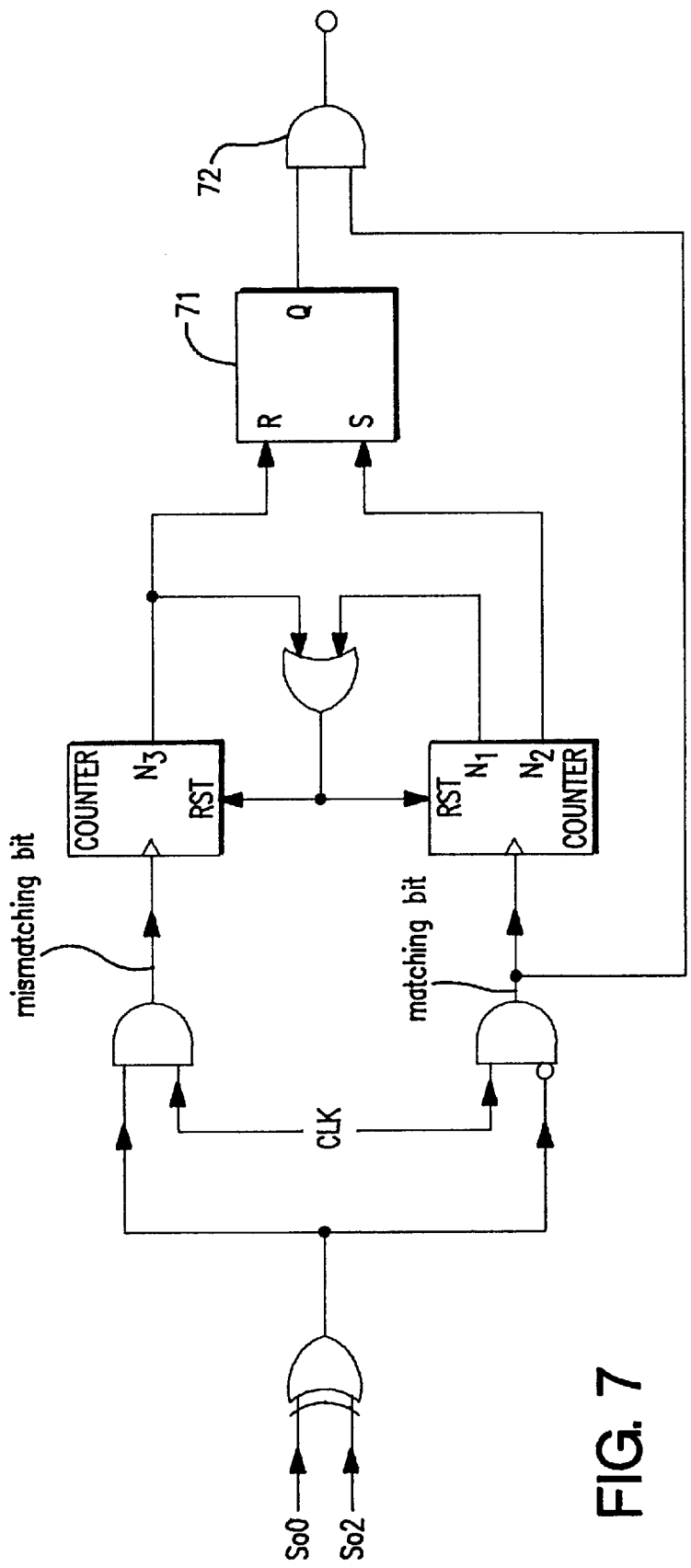
FIG. 7 illustrates a frame synchronizing circuit.
Figure 8:
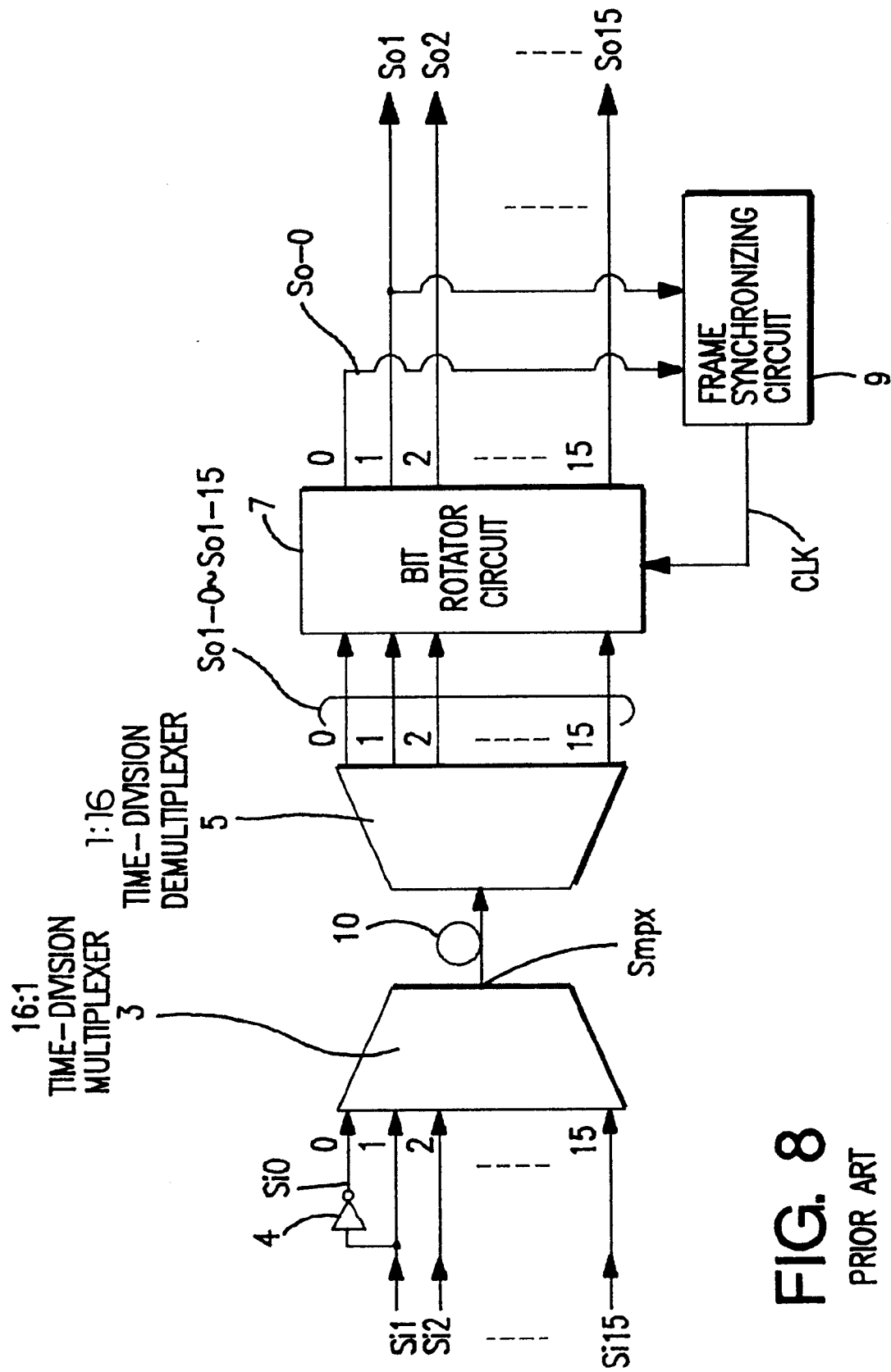
FIG. 8 is a block diagram of a conventional time-division multiplexing/demultiplexing apparatus.

Next, the frame synchronizing circuit 109 detects whether a frame synchronization is established between the multiplexer and the demultiplexer, i.e., the same signal is obtained for the input signal Sik and the output signal Sok (k=1,2, . . . ,15), by monitoring So0 and So2. The detection result is utilized for generating control signals applied to the decoders 108-0 to 108-15 and the bit shift circuit 107. The frame synchronizing circuit 109 is composed of a forward/backward protection type frame synchronization protecting circuit, etc. using a well-known racing counter as shown in FIG. 7. The synchronization protecting circuit composed of this racing counter receives a digital output signal So2 and compares the signal with a digital output signal So0, which is supposed to be a frame synchronization pattern, to thereby count the number of matching bits generated for equal So0, So2 bit pairs, and the number of mismatching bits generated otherwise. Under synchronization, mismatching bits dominates, so the output of the SR flip-flop 71 stays low. Therefore, the output of the AND gate 72 is also low. When the demultiplexer has lost synchronization, matching bit frequency increases, the SR flip-flop 71 is set, and the AND gate 72 transmits matching bits, which are used as hunting pulses (i.e., the phase shift signal CLK). Every time the hunting pulse is emitted, the combination of the bit shift circuit 107 and the selectors 108-0 to 108-15 tries the 16 cases of FIG. 4 sequentially to find out the appropriate case.

In this embodiment, the digital output signals So0 and So2, which are outputted from the selectors 108-2 and 108-0, are compared with each other and, since the inverted signal Si0 of the digital input signal Si2 is used as a frame synchronization signal in this embodiment, those signals are inverted with respect to each other when the original frame phase is normally restored. Thus, when the digital output signals So2 and So0 are matched or the mismatching time is less than a specified value, it can be detected that the synchronization is not yet established. At this time a hunting pulse is thus outputted to thereby shift the frame phase. On the other hand, when the mismatching between the digital output signals So2 and So0 is continued not less than a specified time, it is decided that the initial phase of the frame is normal. Thus, the frame counter 101 stops the output of the hunting pulse, whereby the frame phase is kept as is. The frame synchronization is protected this way.

The frame phase shift signal CLK consisting of the hunting pulse sequence outputted from the frame synchronizing circuit 109 is supplied to the bit shift circuit 107 and the 4-bit hexadecimal frame counter 101 respectively. According to the CLK, the bit shift circuit 107 changes combination of input signals to be subjected to a one bit delay, as shown in FIG. 4.

In addition, the frame counter 101 output CNT is supplied to each of the decoders 110-0 to 110-15. The selectors 108-0 to 108-15 are provided with select signals SEL0 to SEL15 by the decoders 110-0 to 110-15 according to the value of the frame counter 101 output CNT as shown in FIG. 4. In the input/output relationship chart shown in FIG. 4, the case number in the column at the far left as was used in FIG. 3 denotes CNT plus 1. The second time-division demultiplexed signal to be selected at each selector 108-0 to 108-15 is shown in each column of FIG. 4.

In the above embodiment, inverted input signal Si2 is selected as a frame synchronization pattern. However, the inverted signal of another input signal can also be selected. Further, a synchronization pattern, such as fixed patterns (e.g. 1010 . . . , consecutive "0"s or "1"s) or predetermined pseudo random pattern, may be employed, independent of the input signals.

Although time-division multiplexing factors of 8 and 2 are assumed for two-stage multiplexers/demultiplexers in this embodiment, the multiplexing factor of the time-division multiplexers 102-0 to 102-7, and 103, as well as the time-division demultiplexers 105, 106-0 to 106-7 can arbitrarily be selected.

Furthermore, although this example has shown multiplexing and demultiplexing performed in two steps using time-division multiplexers 102-0 to 102-7, and 103, as well as the time-division demultiplexers 105, 106-0 to 106-7, the number of steps in such multiplexing and/or demultiplexing may arbitrarily be set to n steps, where n is an integer.

In addition, in the above described embodiment, the bit shift circuit 107 has been employed. However, when a frame synchronization pattern is independent of input signals, such as some simple fixed pattern or a predetermined pseudo random pattern, and no output signal phase coincidence is required, the bit shift circuit 107 can be removed.

Adopting the configuration as described above, the present invention can have the following effects.

Firstly, since a high multiplexing factor time-division multiplexing/demultiplexing apparatus can be provided simply by combining a plurality of low cost time-division multiplexers and demultiplexers whose multiplexing factor is 8 or below, the manufacturing cost can be significantly reduced.

Secondly, since frame synchronization is established using a frame synchronization pattern signal generated from one input signal, there is no need to supply any frame synchronization signal independently from an external source.

Thirdly, since the frame synchronization pattern signal described above can be generated using only a single inverter circuit and no pattern generator is needed to generate such a frame synchronization pattern signal, the configuration of the apparatus can be simplified and the manufacturing cost can be significantly reduced.

While this invention has been described in connection with certain preferred embodiments, it is to be understood that the subject matter encompassed by way of this invention is not to be limited to those specific embodiments. On the contrary, it is intended for the subject matter of the invention to include all alternative, modification and equivalents as can be included within the spirit and scope of the following claims.

What is claimed is:

1. A method of time-division multiplexing/demultiplexing signals, said method comprising steps of:

first time-division multiplexing a plurality of input signals and a predetermined frame synchronization pattern signal in units of a specified quantity to thereby generate first time-division multiplexed signals;

second time-division multiplexing each of said first time-division multiplexed signals to thereby generate second time-division multiplexed signals;

first time-division demultiplexing said second time-division multiplexed signal to thereby generate a predetermined number of first time-division demultiplexed signals;

second time-division demultiplexing each of said first time-division demultiplexed signals to thereby generate second time-division demultiplexed signals; and permuting orders of said second time-division demultiplexed signals until said predetermined frame synchronization pattern signal is obtained from one of the second time-division demultiplexed signals, wherein the numbers of said input signals and said first time-division multiplexed signals are 15 and 8, respectively, wherein said permuted second time-division demultiplexed signals are outputted from output terminals, and said allowable order permutation patterns are as follows:

(a) from a first signal of said second time-division demultiplexed signals to a first terminal of said output terminals, from third to second, from fifth to third, from seventh to fourth, from ninth to fifth, from eleventh to sixth, from thirteenth to seventh, from fifteenth to eighth, from second to ninth, from fourth to tenth, from sixth to eleventh, from eighth to twelfth, from tenth to thirteenth, from twelfth to fourteenth, from fourteenth to fifteenth, from sixteenth to fifteenth; and (b) k (k=1,2, . . . 15) positions rotation applied to said (a), with same direction for all the k's.

2. The method of a time-division multiplexing/demultiplexing of signals as in claim 1, wherein the following signals are delayed by one bit:

(1) for said (b) where k=1 and the first signal moves to the second terminal under said direction, said sixteenth signal;

(2) for said (b) where k=2 and the first signal moves to the second terminal under said direction, said fourteenth signal is added to said (1);

(3) for said (b) where k=3 and the first signal moves to the second terminal under said direction, said twelfth signal is added to said (2);

(4) for said (b) where k=4 and the first signal moves to the second terminal under said direction, said tenth signal is added to said (3);

(5) for said (b) where k=5 and the first signal moves to the second terminal under said direction, said eighth signal is added to said (4);

(6) for said (b) where k=6 and the first signal moves to the second terminal under said direction, said sixth signal is added to said (5);

(7) for said (b) where k=7 and the first signal moves to the second terminal under said direction, said fourth signal is added to said (6);

(8) for said (b) where k=8 and the first signal moves to the second terminal under said direction, said second signal is added to said (7);

(9) for said (b) where k=9 and the first signal moves to the second terminal under said direction, said fifteenth signal is added to said (8);

(10) for said (b) where k=10 and the first signal moves to the second terminal under said direction, said thirteenth signal is added to said (9);

(11) for said (b) where k=11 and the first signal moves to the second terminal under said direction, said eleventh signal is added to said (10);

(12) for said (b) where k=12 and the first signal moves to the second terminal under said direction, said ninth signal is added to said (11);

(13) for said (b) where k=13 and the first signal moves to the second terminal under said direction, said seventh signal is added to said (12);

(14) for said (b) where k=14 and the first signal moves to the second terminal under said direction, said fifth signal is added to said (13); and

(15) for said (b) where k=15 and the first signal moves to the second terminal under said direction, said third signal is added to said (14).

3. A method of time-division demultiplexing a multiplexed input signal obtained by multiplexing a plurality of signals and a predetermined frame synchronization pattern signal, said method comprising steps of:

first time-division demultiplexing said multiplexed input signal to thereby generate a predetermined number of first time-division demultiplexed signals;

second time-division demultiplexing each of said first time-division demultiplexed signals to thereby generate second time-division demultiplexed signals; and permuting orders of said second time-division demultiplexed signals until said predetermined frame synchronization pattern signal is obtained from one of the second time-division demultiplexed signals, wherein the numbers of said second time division demultiplexed signals and said first time-division demultiplexed signals are 15 and 8, respectively, wherein said permuted second time-division demultiplexed signals are outputted from output terminals, and allowable order permutation patterns for said permuting step are as follows:

(a) from a first signal of said second time-division demultiplexed signals to a first terminal of said output terminals, from third to second, from fifth to third, from seventh to fourth, from ninth to fifth, from eleventh to sixth, from thirteenth to seventh, from fifteenth to eighth, from second to ninth, from fourth to tenth, from sixth to eleventh, from eighth to twelfth, from tenth to thirteenth, from twelfth to fourteenth, from fourteenth to fifteenth, from sixteenth to fifteenth; and (b) k (k=1,2, . . . 15) positions rotation applied to said (a), with same direction for all the k's.

4. The method of a time-division demultiplexing a multiplexed input signal as in claim 3, wherein the following signals are delayed by one bit:

(1) for said (b) where k=1 and the first signal moves to the second terminal under said direction, said sixteenth signal;

(2) for said (b) where k=2 and the first signal moves to the second terminal under said direction, said fourteenth signal is added to said (1);

(3) for said (b) where k=3 and the first signal moves to the second terminal under said direction, said twelfth signal is added to said (2);

(4) for said (b) where k=4 and the first signal moves to the second terminal under said direction, said tenth signal is added to said (3);

(5) for said (b) where k=5 and the first signal moves to the second terminal under said direction, said eighth signal is added to said (4);

(6) for said (b) where k=6 and the first signal moves to the second terminal under said direction, said sixth signal is added to said (5);

(7) for said (b) where k=7 and the first signal moves to the second terminal under said direction, said fourth signal is added to said (6);

(8) for said (b) where k=8 and the first signal moves to the second terminal under said direction, said second signal is added to said (7);

(9) for said (b) where k=9 and the first signal moves to the second terminal under said direction, said fifteenth signal is added to said (8);

(10) for said (b) where k=10 and the first signal moves to the second terminal under said direction, said thirteenth signal is added to said (9);

(11) for said (b) where k=11 and the first signal moves to the second terminal under said direction, said eleventh signal is added to said (10);

(12) for said (b) where k=12 and the first signal moves to the second terminal under said direction, said ninth signal is added to said (11);

(13) for said (b) where k=13 and the first signal moves to the second terminal under said direction, said seventh signal is added to said (12);

(14) for said (b) where k=14 and the first signal moves to the second terminal under said direction, said fifth signal is added to said (13); and

(15) for said (b) where k=15 and the first signal moves to the second terminal under said direction, said third signal is added to said (14).

5. An apparatus for time-division multiplexing/demultiplexing of signals, comprising:

first time-division multiplexers for multiplexing a plurality of input signals and a predetermined frame synchronization pattern signal to thereby generate first time-division multiplexed signals;

a second time-division multiplexer for multiplexing each of said first time-division multiplexed signals to thereby generate at least one second time-division multiplexed signal;

a first time-division demultiplexer for demultiplexing each of said second time-division multiplexed signals to thereby generate a predetermined number of first time-division demultiplexed signals;

second time-division demultiplexers for demultiplexing each of said first time-division demultiplexed signals to thereby generate second time-division demultiplexed signals; and a frame synchronizing circuit for maintaining synchronization of signals by permuting orders of said second time-division demultiplexed signals until a signal matching said predetermined frame synchronization pattern signal is obtained from a second time-division demultiplexed signal corresponding to said predetermined frame synchronization pattern signal, wherein the numbers of said input signals and said first time-division multiplexed signals number 15 and 8, respectively, further comprising a plurality of output terminals for outputting said permuted second time-division demultiplexed signals, wherein said permutation is executed according to patterns including:

(a) from a first signal of said second time-division demultiplexed signals to a first terminal of said output terminals, from third to second, from fifth to third, from seventh to fourth, from ninth to fifth, from eleventh to sixth, from thirteenth to seventh, from fifteenth to eighth, from second to ninth, from fourth to tenth, from sixth to eleventh, from eighth to twelfth, from tenth to thirteenth, from twelfth to fourteenth, from fourteenth to fifteenth, from sixteenth to fifteenth; and (b) k (k=1,2, . . . 15) positions rotation applied to said (a), with same direction for all the k's.

6. The apparatus for time-division multiplexing/demultiplexing of signals as in claim 5, wherein the following signals are delayed by one bit:

(1) for said (b) where k=1 and the first signal moves to the second terminal under said direction, said sixteenth signal;

(2) for said (b) where k=2 and the first signal moves to the second terminal under said direction, said fourteenth signal is added to said (1);

(3) for said (b) where k=3 and the first signal moves to the second terminal under said direction, said twelfth signal is added to said (2);

(4) for said (b) where k=4 and the first signal moves to the second terminal under said direction, said tenth signal is added to said (3);

(5) for said (b) where k=5 and the first signal moves to the second terminal under said direction, said eighth signal is added to said (4);

(6) for said (b) where k=6 and the first signal moves to the second terminal under said direction, said sixth signal is added to said (5);

(7) for said (b) where k=7 and the first signal moves to the second terminal under said direction, said fourth signal is added to said (6);

(8) for said (b) where k=8 and the first signal moves to the second terminal under said direction, said second signal is added to said (7);

(9) for said (b) where k=9 and the first signal moves to the second terminal under said direction, said fifteenth signal is added to said (8);

(10) for said (b) where k=10 and the first signal moves to the second terminal under said direction, said thirteenth signal is added to said (9);

(11) for said (b) where k=11 and the first signal moves to the second terminal under said direction, said eleventh signal is added to said (10);

(12) for said (b) where k=12 and the first signal moves to the second terminal under said direction, said ninth signal is added to said (11);

(13) for said (b) where k=13 and the first signal moves to the second terminal under said direction, said seventh signal is added to said (12);

(14) for said (b) where k=14 and the first signal moves to the second terminal under said direction, said fifth signal is added to said (13); and

(15) for said (b) where k=15 and the first signal moves to the second terminal under said direction, said third signal is added to said (14).

7. An apparatus for time-division demultiplexing multiplexed signals, comprising:

a first time-division demultiplexer for demultiplexing multiplexed signals into a plurality of signals and a predetermined frame synchronization pattern signal to thereby generate a predetermined number of first time-division demultiplexed signals;

a plurality of second time-division demultiplexers for demultiplexing each of said first time-division demultiplexed signals to thereby generate second time-division demultiplexed signals; and a frame synchronizing circuit for maintaining synchronization of signals by permuting orders of said second time-division demultiplexed signals until a signal matching said predetermined frame synchronization pattern signal is obtained from a second time-division demultiplexed signal corresponding to said predetermined frame synchronization pattern signal, wherein second time-division multiplexed signals and said first time-division demultiplexed signals number 15 and 8, respectively, further comprising a plurality of output terminals for outputting said permuted second time-division demultiplexed signals, wherein said permutation is executed according to patterns including:

(a) from a first signal of said second time-division demultiplexed signals to a first terminal of said output terminals, from third to second, from fifth to third, from seventh to fourth, from ninth to fifth, from eleventh to sixth, from thirteenth to seventh, from fifteenth to eighth, from second to ninth, from fourth to tenth, from sixth to eleventh, from eighth to twelfth, from tenth to thirteenth, from twelfth to fourteenth, from fourteenth to fifteenth, from sixteenth to fifteenth; and (b) k (k=1,2, . . . 15) positions rotation applied to said (a), with same direction for all the k's.

8. The apparatus for time-division demultiplexing of multiplexed signal as in claim 7, wherein the following signals are delayed by one bit:

(1) for said (b) where k=1 and the first signal moves to the second terminal under said direction, said sixteenth signal;

(2) for said (b) where k=2 and the first signal moves to the second terminal under said direction, said fourteenth signal is added to said (1);

(3) for said (b) where k=3 and the first signal moves to the second terminal under said direction, said twelfth signal is added to said (2);

(4) for said (b) where k=4 and the first signal moves to the second terminal under said direction, said tenth signal is added to said (3);

(5) for said (b) where k=5 and the first signal moves to the second terminal under said direction, said eighth signal is added to said (4);

(6) for said (b) where k=6 and the first signal moves to the second terminal under said direction, said sixth signal is added to said (5);

(7) for said (b) where k=7 and the first signal moves to the second terminal under said direction, said fourth signal is added to said (6);

(8) for said (b) where k=8 and the first signal moves to the second terminal under said direction, said second signal is added to said (7);

(9) for said (b) where k=9 and the first signal moves to the second terminal under said direction, said fifteenth signal is added to said (8);

(10) for said (b) where k=10 and the first signal moves to the second terminal under said direction, said thirteenth signal is added to said (9);

(11) for said (b) where k=11 and the first signal moves to the second terminal under said direction, said eleventh signal is added to said (10);

(12) for said (b) where k=12 and the first signal moves to the second terminal under said direction, said ninth signal is added to said (11);

(13) for said (b) where k=13 and the first signal moves to the second terminal under said direction, said seventh signal is added to said (12);

(14) for said (b) where k=14 and the first signal moves to the second terminal under said direction, said fifth signal is added to said (13); and

(15) for said (b) where k=15 and the first signal moves to the second terminal under said direction, said third signal is added to said (14).

* * * * *